United States Patent [19]

Suda

[11] Patent Number: 4,852,981

[45] Date of Patent: Aug. 1, 1989

[54] IMAGING LENS SYSTEM COMPRISING A DISTRIBUTED INDEX LENS AND A PLANO-CONVEX LENS

[75] Inventor: Shigeyuki Suda, Machida, Japan

[73] Assignee: Canon Kabushiki Kaisha, Tokyo, Japan

[21] Appl. No.: 867,497

[22] Filed: May 28, 1986

[30] Foreign Application Priority Data

May 31, 1985 [JP] Japan ............................. 60-119433

[51] Int. Cl.$^4$ .............................................. G02B 3/00
[52] U.S. Cl. ................................................... 350/413
[58] Field of Search ............................ 350/413, 409

[56] References Cited

U.S. PATENT DOCUMENTS

| | | | |
|---|---|---|---|
| 3,486,808 | 12/1969 | Hamblen | 350/413 |
| 4,639,094 | 1/1987 | Aono | 350/413 |
| 4,647,159 | 3/1987 | Baba | 350/413 |
| 4,674,843 | 6/1987 | Baba et al. | 350/413 |
| 4,696,552 | 9/1987 | Hattori et al. | 350/413 |
| 4,723,843 | 2/1988 | Zobel | 350/413 |
| 4,755,039 | 7/1988 | Hattori | 350/413 |
| 4,762,403 | 8/1988 | Hattori | 350/413 |
| 4,770,506 | 9/1988 | Baba | 350/413 |

FOREIGN PATENT DOCUMENTS

| | | | |
|---|---|---|---|
| 3626603 | 2/1987 | Fed. Rep. of Germany | 350/414 |
| 0205122 | 11/1983 | Japan | 350/413 |
| 0195611 | 11/1984 | Japan | 350/413 |
| 60-163015 | 1/1985 | Japan . | |
| 0203909 | 10/1985 | Japan | 350/413 |

OTHER PUBLICATIONS

Article in Camera International, No. 4, Apr. 1965, pp. 36–37.

Primary Examiner—John K. Corbin
Assistant Examiner—Ronald M. Kachmarik
Attorney, Agent, or Firm—Fitzpatrick, Cella, Harper & Scinto

[57] ABSTRACT

An imaging lens system including a distributed index lens which has planar opposite end surfaces and in which the index gradient near the optic axis is substantially zero and the refractive index becomes progressively higher from the optic axis toward the marginal portion, and a plano-convex lens having a planar surface on the side thereof which is adjacent to the distributed index lens and formed of a homogeneous medium.

10 Claims, 17 Drawing Sheets

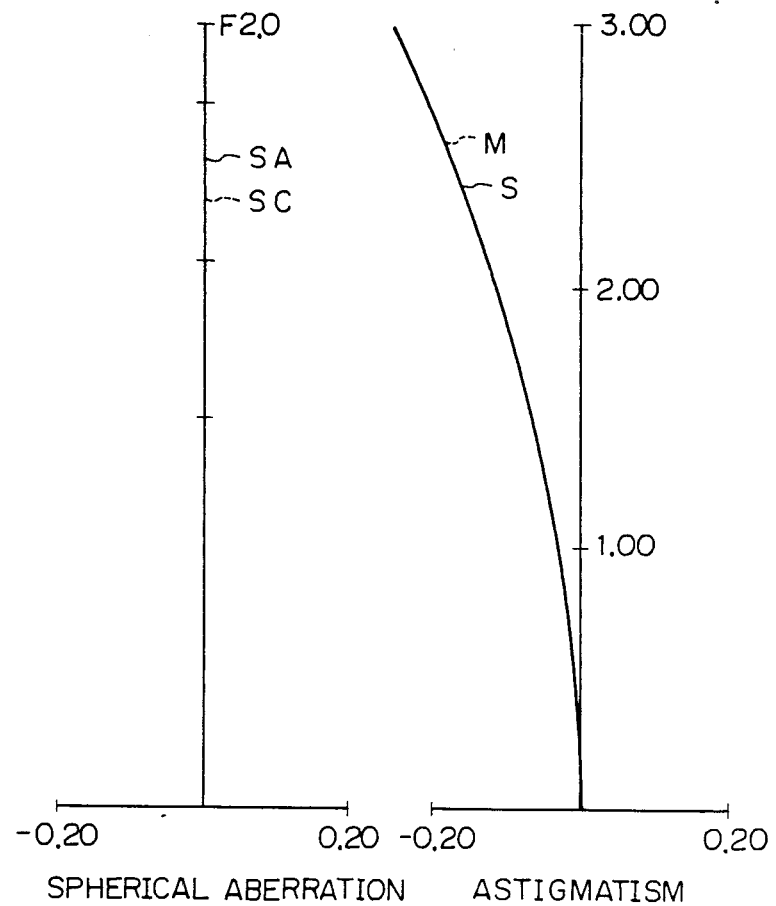

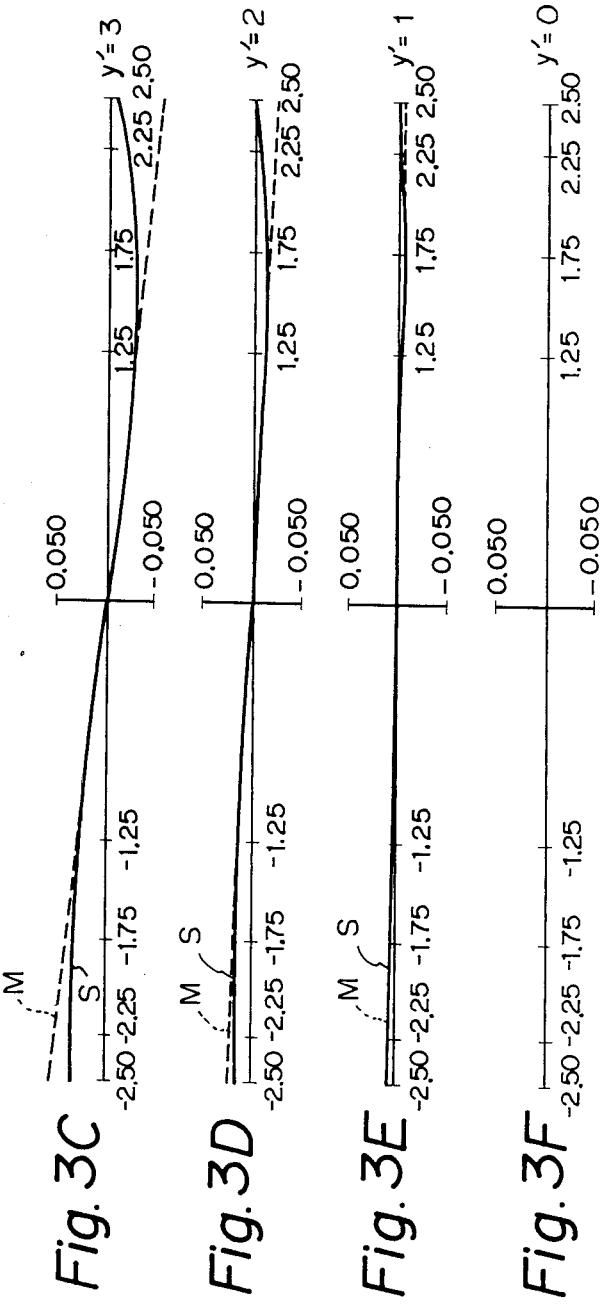

SPHERICAL ABERRATION

ASTIGMATISM

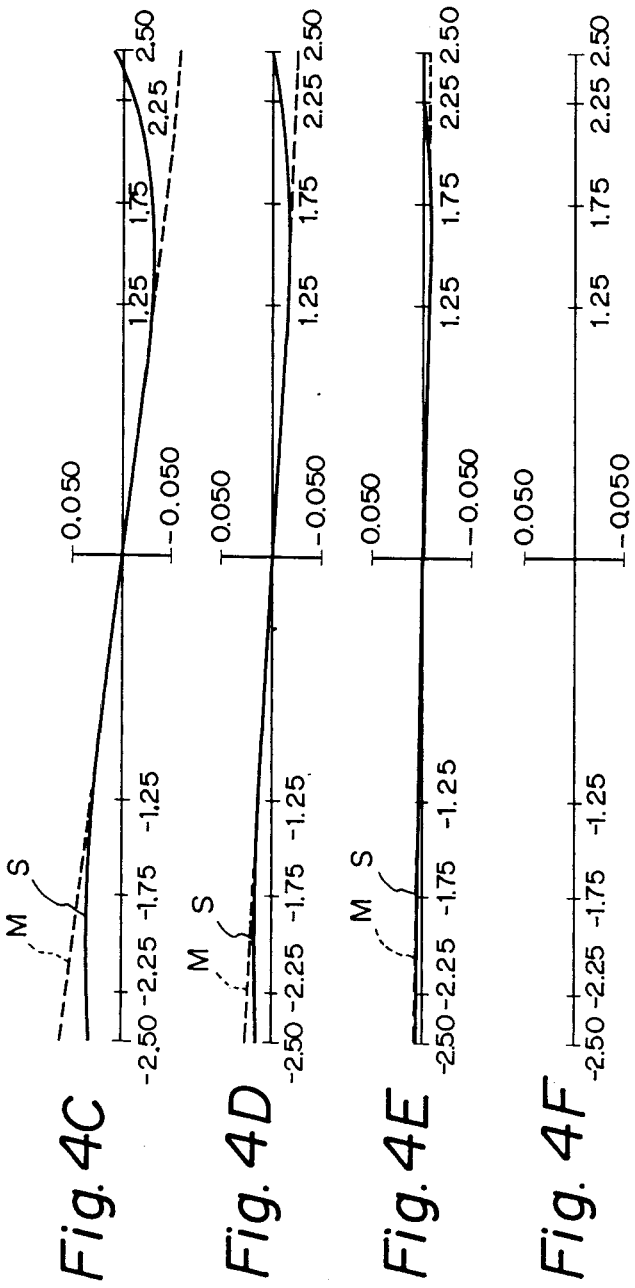

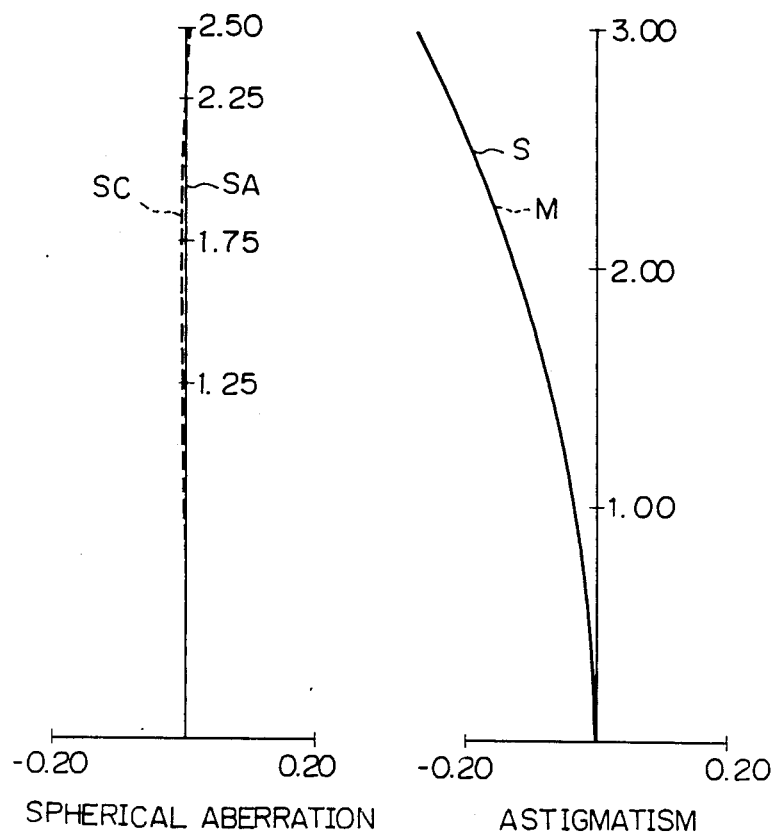

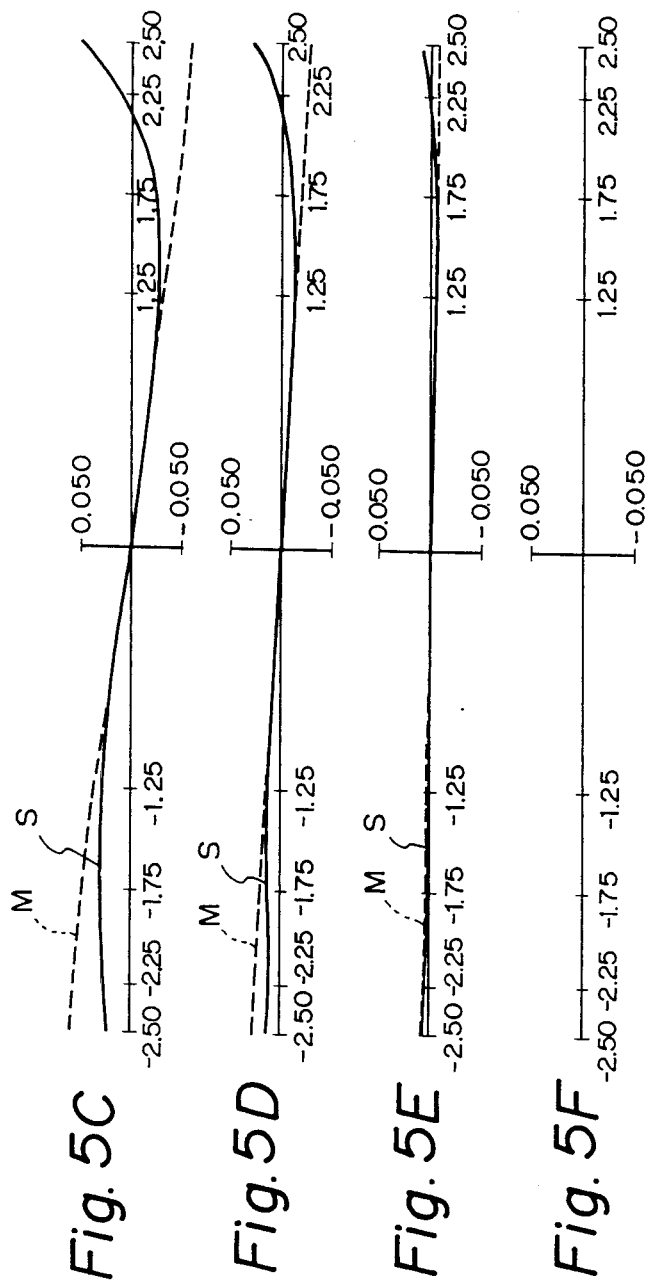

SPHERICAL ABERRATION  ASTIGMATISM

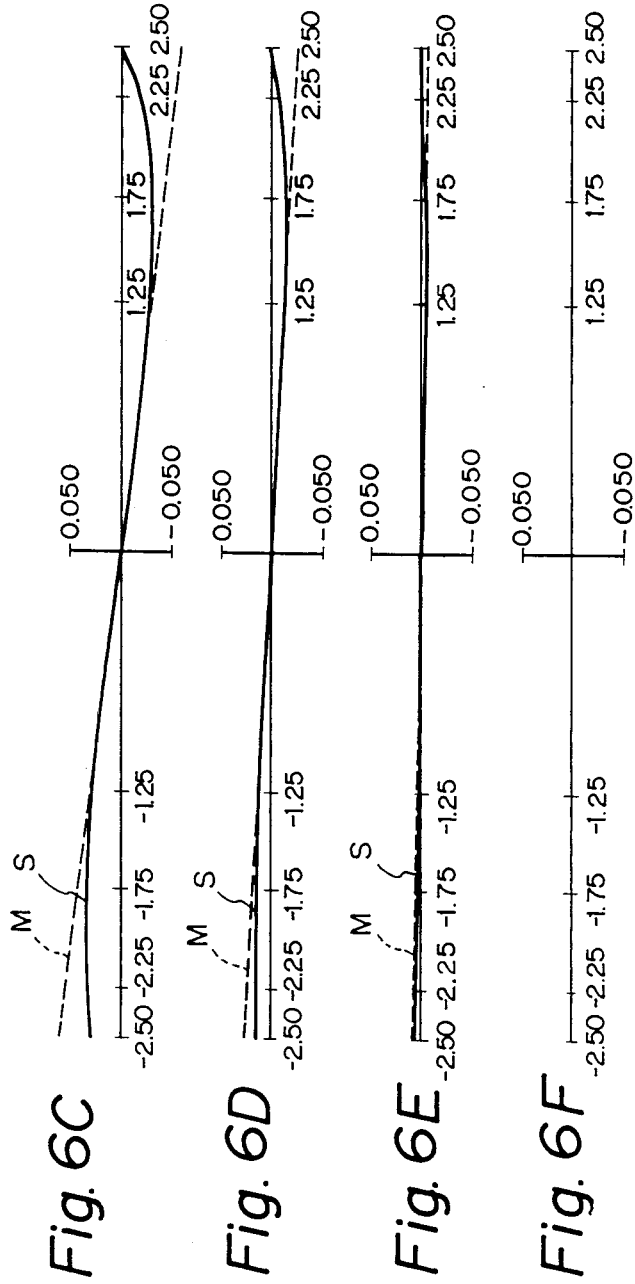

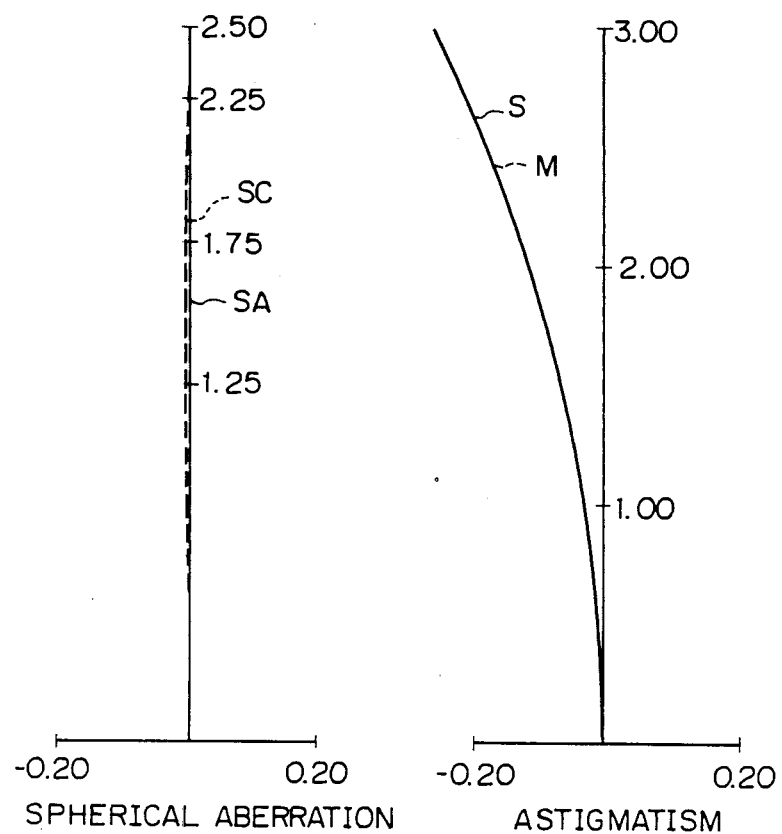

SPHERICAL ABERRATION   ASTIGMATISM

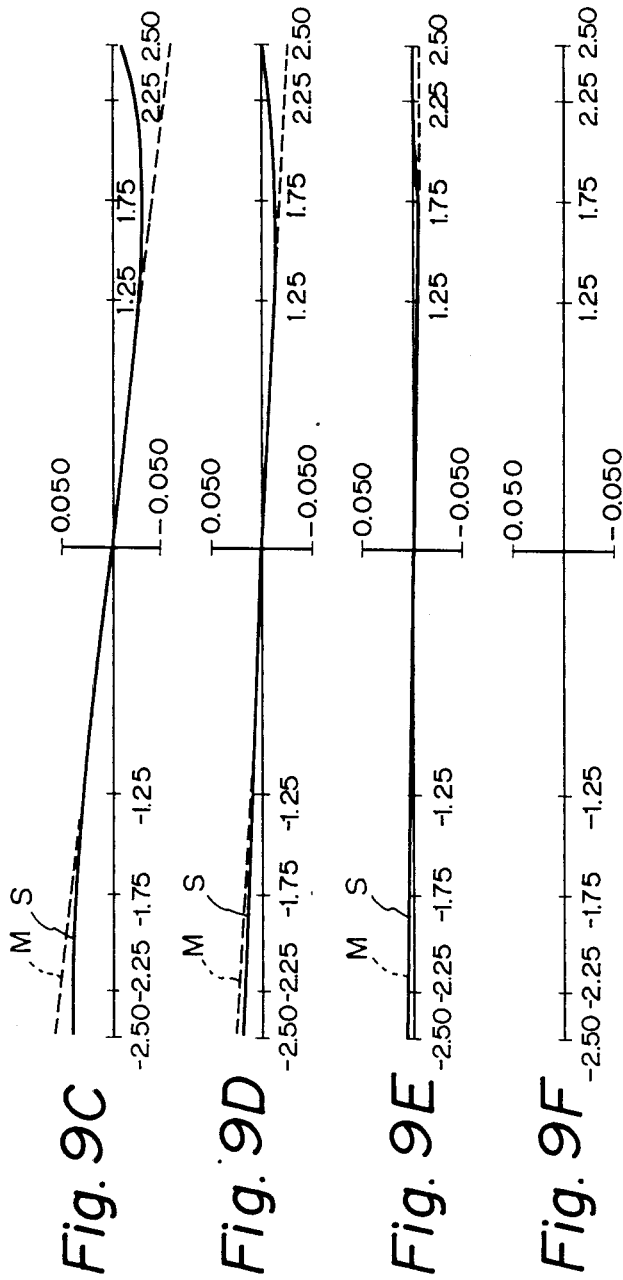

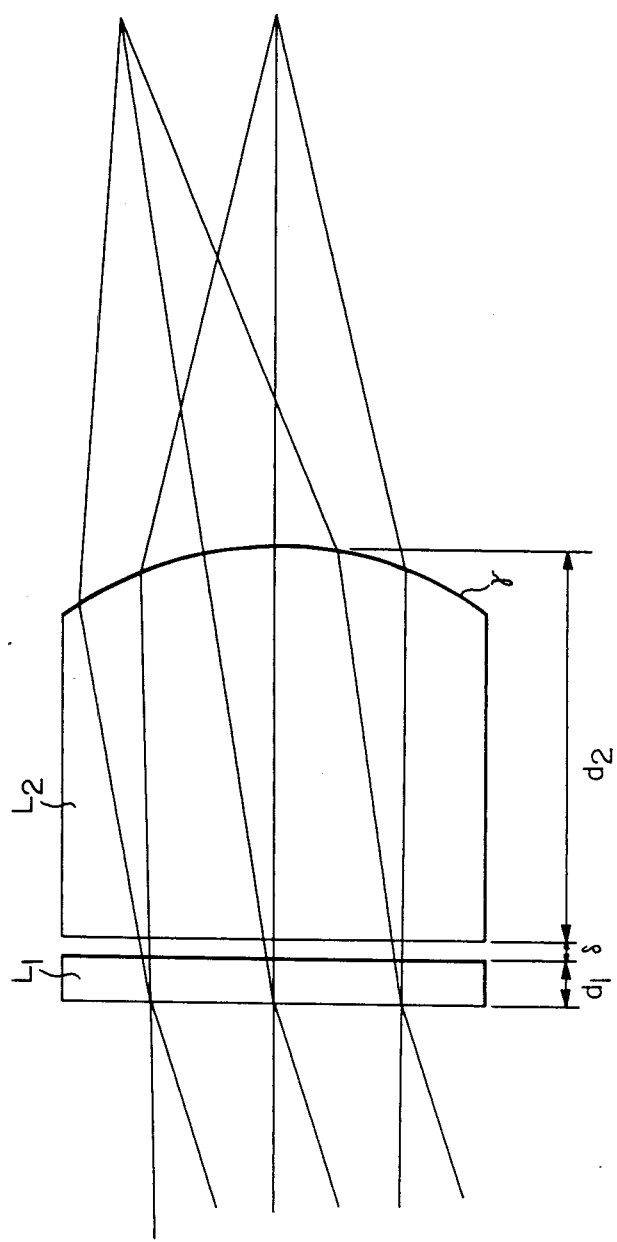

IMAGING LENS SYSTEM COMPRISING A DISTRIBUTED INDEX LENS AND A PLANO-CONVEX LENS

BACKGROUND AND SUMMARY OF THE INVENTION

This invention relates to an imaging lens system, and in particular, to an imaging lens suitable for the condensing and collimation of a semiconductor laser or a light-emitting diode, and utilizing a distributed index lens.

A lens having an index distribution in a direction perpendicular to the optic axis is well known as a Celfoc lens (trade name) and is used as the reading system of a copying apparatus or as a connector for optical communications.

In recent years, attempts have been made to use such a distributed index lens as the pick-up objective of a compact disk or the like. The forms of its use are disclosed, for example, in Japanese Laid-Open Patent Application Nos. 205122/1983, 62816/1984 and 62817/1984.

What is disclosed as a specific construction in Japanese Laid-Open Patent Application No. 205122/1983 is a lens system comprising a distributed index lens in which the refractive index becomes progressively lower substantially in a square distribution from the optic axis to the marginal portion and which has planar end surfaces, and a homogeneous convex lens separated from the distributed index lens by a finite distance. Also, the lens disclosed in Japanese Laid-Open Patent Application No. 62816/1984 is a lens system comprising a distributed index lens in which the refractive index becomes progressively higher from the optic axis to the marginal portion and which has planar end surfaces, and two to three lenses in which the refractive index becomes progressively lower from the optic axis to the marginal portion and which are cemented to or separated from the distributed index lens. The lens disclosed in Japanese Laid-Open Patent Application No. 62817/1984 is comprised of two distributed index lenses in which the refractive index becomes progressively lower from the center to the marginal portion and which are cemented together.

However, the ion exchange method is generally used to manufacture the above-described distributed index lenses according to the prior art, and this method basically utilizes heat diffusion and therefore, requires a relatively long time for the manufacture and has a severe problem in the manufacturing process, particularly for lenses of great aperture. Further, even if the lenses have an excellent index distribution shape from the viewpoint of aberration correction, a difference in manufacture occurs relative to the condition of actual natural diffusion and therefore, in many instances, the index distribution has been difficult to control by the ion exchange method. Also, some of the lenses disclosed in the aforementioned laid-open patent applications are designed with the application thereof to the objective of an optical pick-up system taken into account. Therefore, spherical aberration and coma are eliminated therefrom, but astigmatism remains in many instances. These lens systems could only be used up to the angle of view of the order of 3°–4°. That is, they could not be said to have a performance sufficient to be used in a collimating system or the like which required a greater allowance for the setting with a light source.

In view of the above-noted disadvantages peculiar to the prior art the present invention provides for an imaging lens which is easy to manufacture and efficiently achieves aberration correction and has such an imaging performance that permits the lens to be used even for a wide angle of view of 10° or greater.

The imaging lens according to the present invention comprises a distributed index lens which has planar opposite end surfaces in which the index gradient near the optic axis is substantially zero and the refractive index becomes progressively higher from the optic axis toward the marginal portion. The plano-convex lens has a planar surface on the side thereof which is adjacent to the distributed index lens and is formed of a homogeneous medium, thereby achieving the above objectives.

BRIEF DESCRIPTION OF THE DRAWINGS

FIGS. 3A and 3B through 9A and 9B show the spherical aberration and astigmatism in Embodiments Nos. 1 through 7 of the imaging lens according to the present invention.

FIGS. 3C–3F through 9C–9F show the lateral aberration in Embodiment Nos. 1 through 7 of the imaging lens according to the present invention.

FIG. 10 shows another embodiment of the imaging lens according to the present invention in which a distributed index lens is spaced from a plano-convex lens.

DESCRIPTION OF THE PREFERRED EMBODIMENTS

The distributed index lens is formed 0of a transparent medium such as plastic or glass and its opposite end surfaces are planar and therefore, such a lens is easy to work. A method of forming a distribution in which the refractive index becomes progressively higher from the optic axis toward the marginal portion of the lens is disclosed in Japanese Laid-Open Patent Application No. 6547/1972, etc. A lens in which the index gradient near the optic axis is substantially zero and in which only the marginal portion of the lens has an index gradient and which is formed in the process of making a distributed index lens by the use of the natural diffusion method, which is a kind of ion diffusion method, is disclosed in Telecommunications Society Collected Papers OQE84-120, etc. Accordingly, a distributed index lens applied to the present imaging lens encounters few problems in manufacture. Even in a case where it is made into a cemented lens, the cementing thereof to said plano-convex lens of homogeneous medium can be easily accomplished.

The principle of aberration correction of the imaging lens according to the present invention will hereinafter be described in detail.

Figure 1:
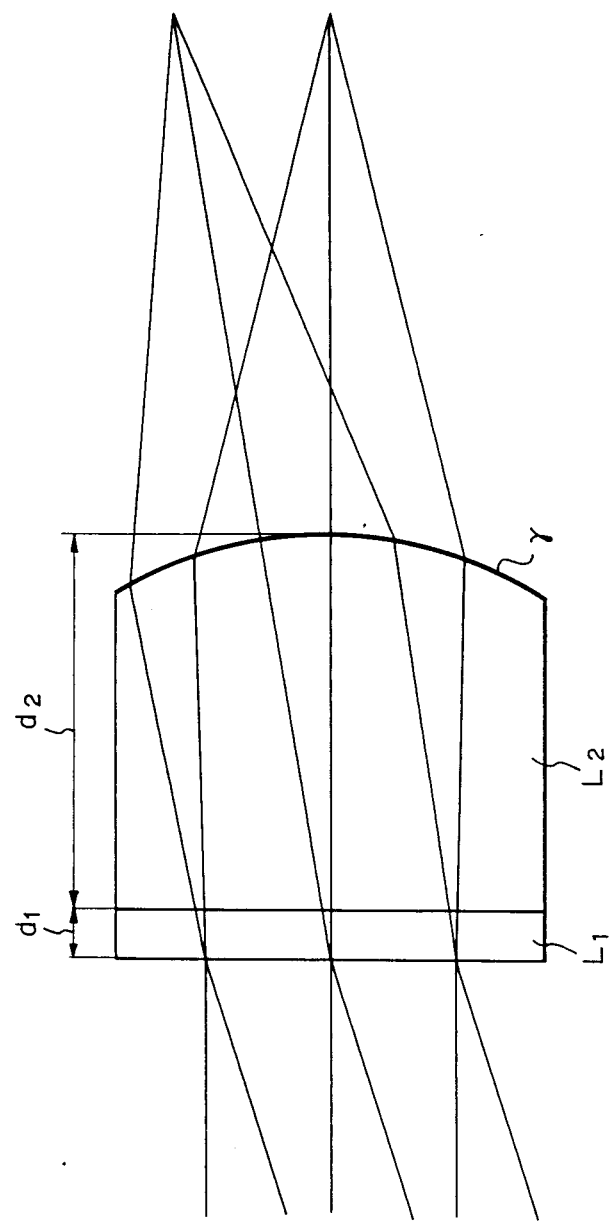
FIG. 1 shows the optical path of Embodiment No. 1 of the imaging lens according to the present invention.

As shown in FIG. 1, the distributed index lens is designated by L1 and the plano-convex lens of homogeneous medium is designated by L2. The opposite end surfaces of the lens L1 are planar and the index gradient near the optic axis thereof is substantially zero, whereby the paraxial focal length thereof is substantially infinite.

Also, by making the refractive index progressively higher from the optic axis to the marginal portion of the lens, light rays of great incidence height diverge after being transmitted through the medium of finite thickness of the lens L1. On the other hand, if the refractive index of the lens L2 is n and the absolute value of the radius of curvature of the convex surface thereof is r, the focal length f of the lens L2 is $r/(n-1)$. The spherical aberration of the lens L1 does not depend on the thickness and pupil position of the lens for an infinity object point lying at the planar surface side, and as the incidence height becomes higher, the degree of convergence is stronger. Therefore, the negative spherical aberration is created and, for the same focal length, as the refractive index n of the lens L2 is lower, the degree of negativity increases. Further, it is known that when the entrance pupil to the lens L2 is provided at a position equal to the absolute value r of the radius of curvature of the lens and the lens thickness $d_2$ of the lens L2 is made equal to r, coma and astigmatism do not occur from the lens L2. This will be readily understood from the fact that if in the auxiliary amount $$\overline{h}Q = \overline{h}N\left(\frac{1}{r} - \frac{1}{t}\right)$$

(Q: invariable amount of abbe) for calculating aberration coefficients described in page 86 of *The Lens Designing Method* (published by Kyoritsu Publishing Co., Ltd. and written by Matsui), $t = r$, then $\overline{h}Q = 0$ and tertiary coma coefficient II and astigmatism coefficient III are zero. However, in the imaging lens accrording to the present invention, if the surface of the lens L1 adjacent to the object is the entrance pupil position, the values of the tertiary spherical aberration, coma and astigmatism coefficients in this surface are zero. To correct the spherical aberration occurring in the convex surface of the lens L2, it is necessary for the lens L1 to take partial charge of spherical aberration opposite in sign and substantially equal in absolute value to the amount of aberration by a finite index gradient and lens thickness $d_1$. In this case, however, the lens L1 produces minute amounts of coma and astigmatism, which will be of negative values similar to the spherical aberration coefficient, if expressed by tertiary aberration coefficients.

Accordingly, it is desirable that the lens thickness $d_2$ of the lens L2 not be made equal to the absolute value r of the radius of curvature, but that intentional coma and astigmatism be caused to occur to thereby correct the coma and astigmatism occurring from the lens L1. That is, if the lens thickness of the lens L1 is $d_1$, and the lens thickness of the lens L2 is $d_2$, $d_1/2 + d_2$ is made substantially equal to the radius of curvature r of the lens L2, thereby becoming an optimum value. By satisfying these conditions, the tertiary coma coefficient and astigmatism coefficient occurring from the convex surface of the lens L2 become positive values, and these values are opposite in sign and substantially equal in absolute value to the tertiary coma coefficient occurring in the lens L1. Thus, correction of spherical aberration, coma and astigmatism in the entire system becomes possible. Further, this condition may be quantitatively expressed as follows:

$$S = |(d_1/2 + d_2 - r)/f| < 0.01 \quad (1)$$

Here, it is for the purpose of normalization that $(d_1/2 + d_2 - r)$ is divided by the focal length f of the lens system. The value of this focal length f is a value represented by $r/(n-1)$ when the absolute value of the radius of curvature of the lens L2 is r and the refractive index of the lens L2 is n, and as a matter of course, it coincides with $r/(n-1)$ both for the lens L2 singly and the combination of the lens L1 and the lens L2. Also, where F-number is greater (darker) than 2, the restrictive range of equation (1) above can be widened. In any case, the optimum value is in the vicinity of 0.

Embodiment No. 1 through 7 of the imaging lens according to the present invention will be shown in Table 1 below. In all embodiments, the focal length f and F-number, i.e., F No. are common, that is, $f = 10.0$ mm and F No. $= 2.0$.

As regards the symbols $d_1$, $d_2$, r, n and S in Table 1, as previously described, $d_1$ represents the lens thickness of the distributed index lens L1; $d_2$ represents the axial thickness of the plano-convex lens L2; r represents the absolute value of the radius of curvature of the convex surface of the plano-convex lens L2; n represents the refractive index of the plano-convex lens L2; and S represents the value of the left side of equation (1). $N_0$, $N_1$, $N_2$, $N_3$, $N_4$ and $N_5$ represent the coefficients of the index distribution N(h) of the distributed index lens L1 represented by the following equation (2):

$$N(h) = N_0 + N_1 h^2 + N_2 h^4 + N_3 h^6 + N_4 h^8 + N_5 h^{10} \quad (2),$$

where h represents the radial distance from the optic axis.

Figure 2:
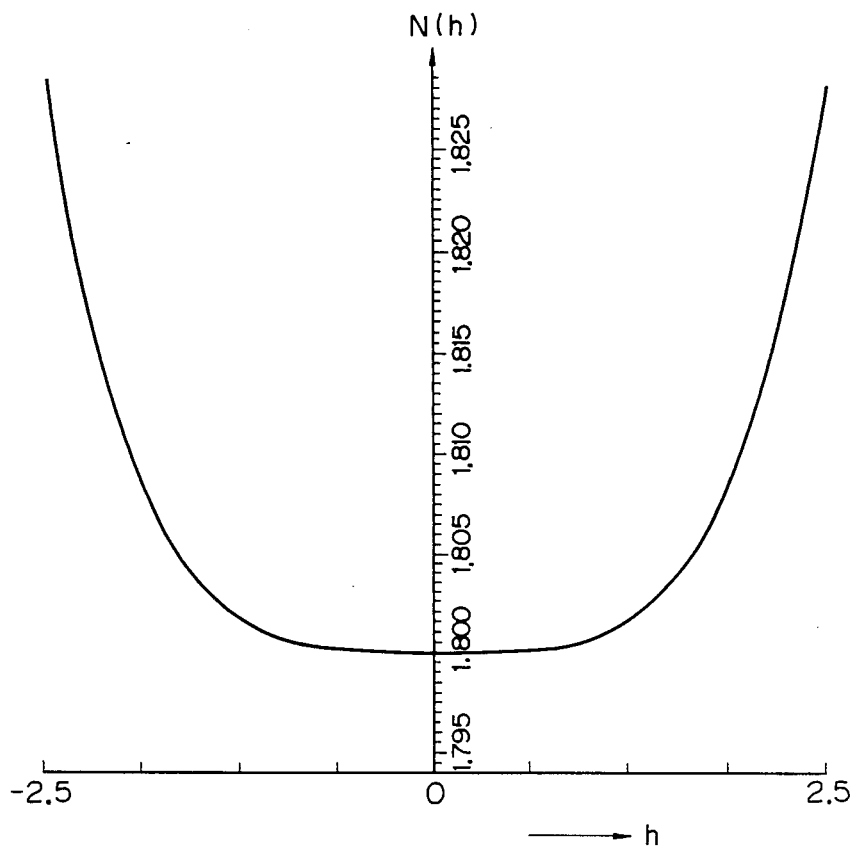
FIG. 2 shows the index distribution of a distributed index lens used in Embodiment No. 1 of the imaging lens according to the present invention.
Figure 4A:
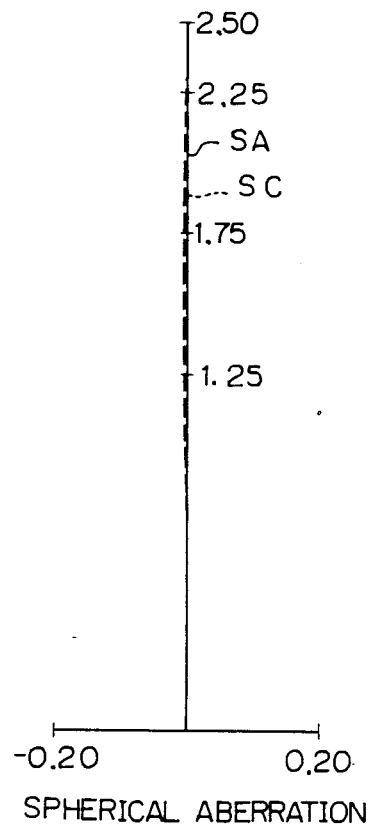
Figure 4B:
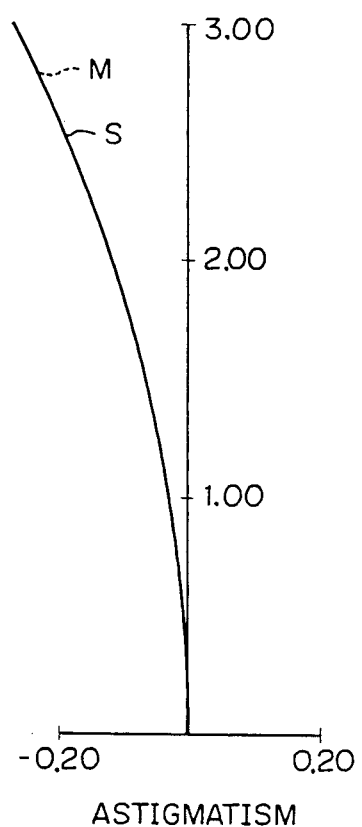
Figures 6A, 6B:
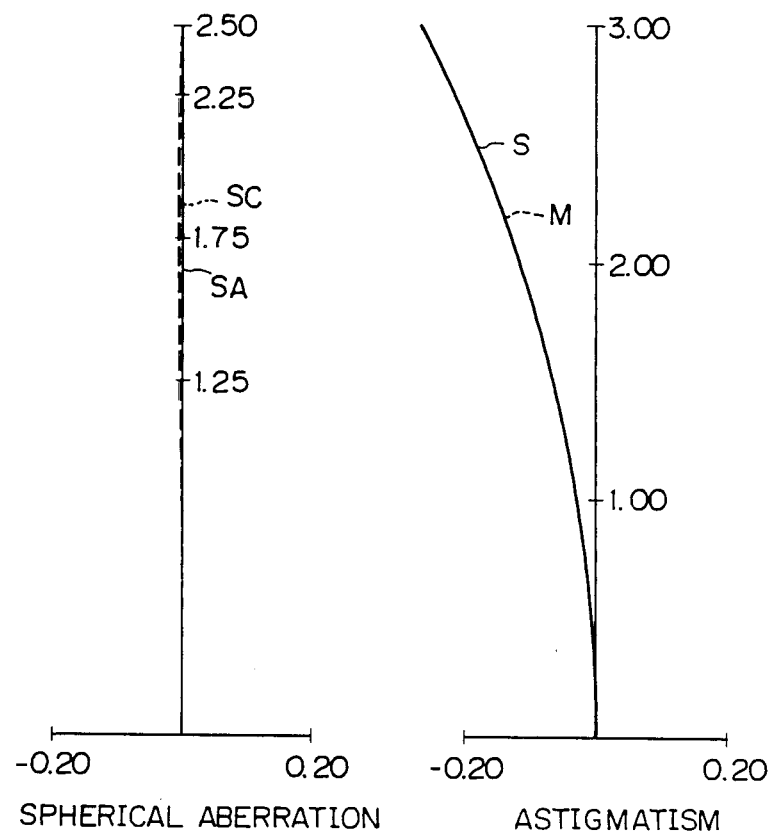
Figure 7C:
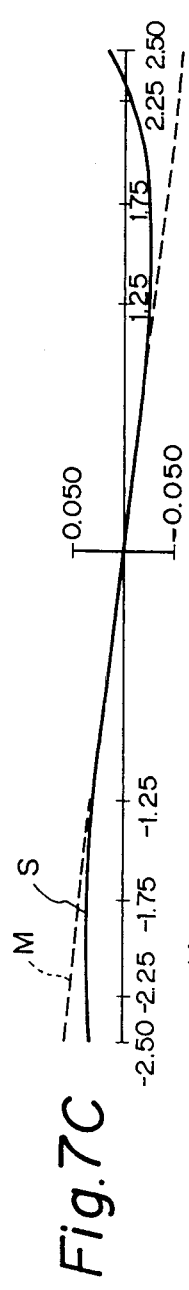
Figure 7D:
Figure 7E:
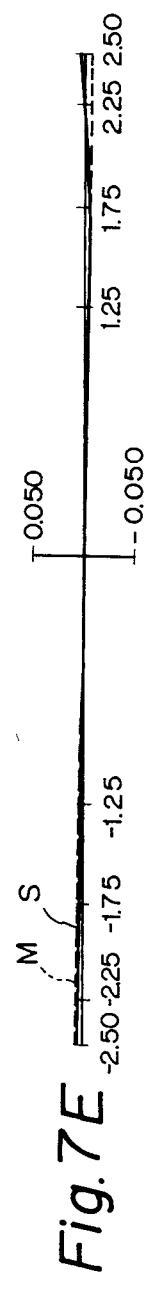
Figure 7F:
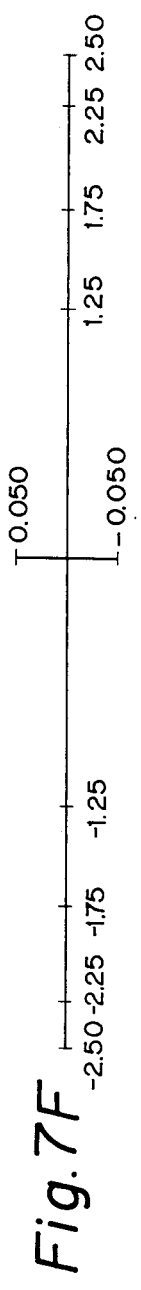
Figures 8A, 8B:
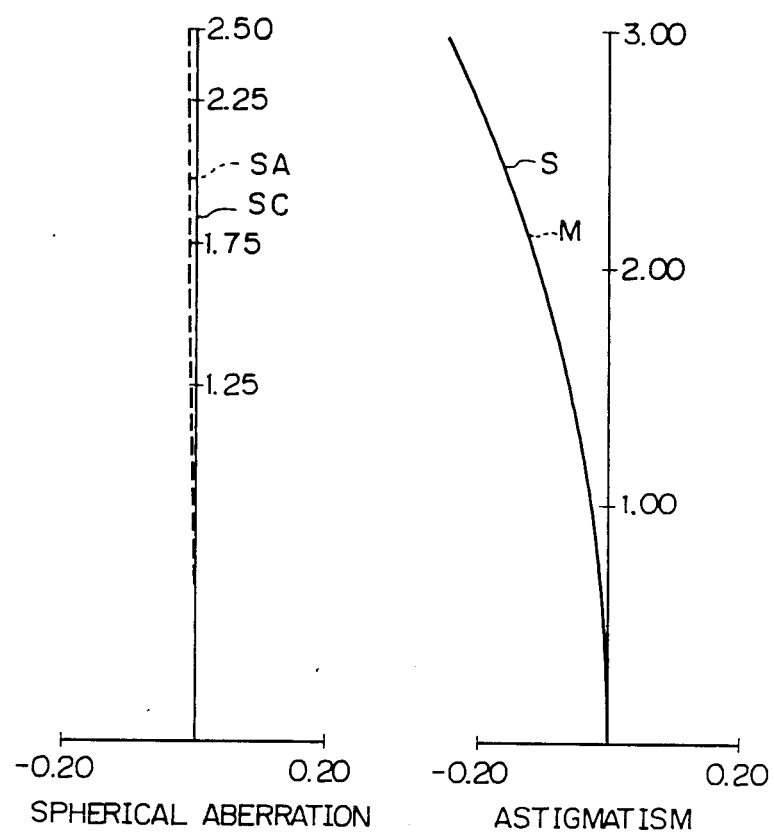
Figure 8C:
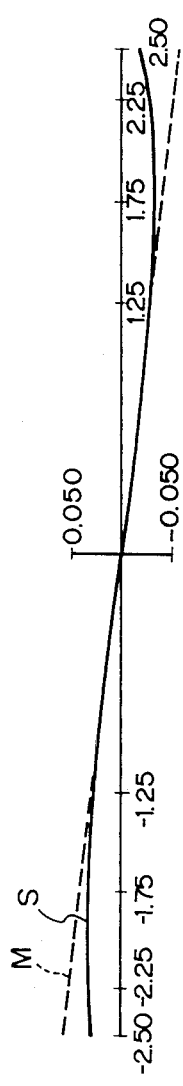
Figure 8D:
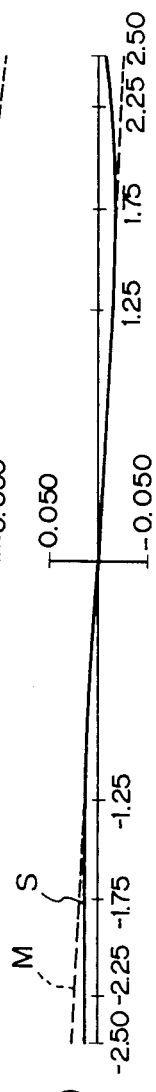
Figure 8E:
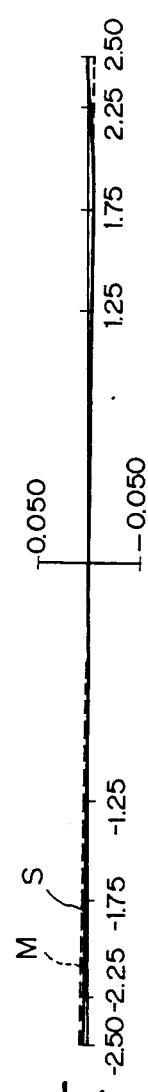
Figure 8F:
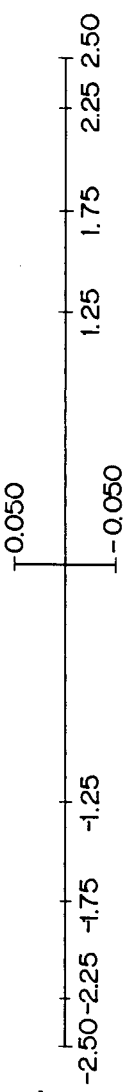
Figures 9A, 9B:
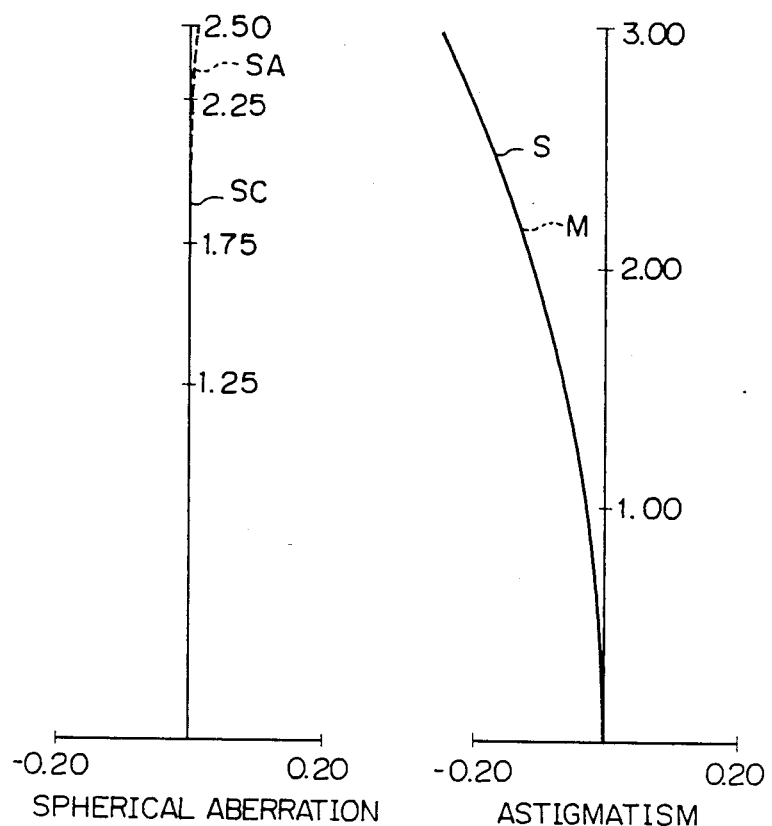

FIG. 1 shows the optical path of the imaging lens in Embodiment No. 1, and FIG. 2 shows the shape of the index distribution of the distributed index lens L1 constituting the imaging lens in Embodiment No. 1. In FIG. 2, the abscissa represents the distance h from the optic axis and the ordinate represents the refractive index. FIGS. 3A-3F through 9A-9B show the aberrations of the imaging lenses in Embodiment Nos. 1 through 7 shown in Table 1. In these Figures, A shows spherical aberration, B shows astigmatism; C-F show lateral aberrations; SA represents spherical aberration; SC represents sine condition; S and M represent the aberrations in the sagittal plane and the meridional plane, respectively; and y' represents the image height.

As can be seen from the aberration graphs of FIGS. 3A-3F through 9A-9F, the present imaging lens is a lens which can correct not only spherical aberration and coma but also astigmatism, and is particularly efficient in the ability to correct spherical aberration and therefore nearly satisfies the sine condition and barely creates the coma in the paraxial area. The imaging lens according to the present invention is not restricted to the above-described embodiment. Imaging lenses of various specifications can be provided by selecting the index distribution and lens thickness of the distributed index lens, and the on-axis thickness, the radius of curvature, the refractive index, etc., of the plano-convex lens.

While in the above-described embodiment, a cemented lens comprising a distributed index lens and a lens of homogeneous medium has been shown, it is also possible to provide a good imaging lens by combining the two lenses with the planar surfaces thereof opposed in parallelism to each other with an air space interposed therebetween, as shown in FIG. 10, in which a distributed index lens $L_1$ having a thickness $d_1$ is spaced from a plano-convex lens $L_2$, having a thickness $d_2$, by a distance $\delta$.

As described above, the imaging lens according to the present invention is a lens which is easy to manufacture by a predetermined combination of a distributed index lens and a lens of homogeneous medium which has a wide angle of view of 14°–15°, and more specifically, it is an imaging lens which is capable of correcting spherical aberration, coma and astigmatism and is suitable for the pick-up of an optical disk or the collimation of a semiconductor laser.

TABLE 1

| No. | $d_1$ | $d_2$ | $N_0$ | $N_1$ | $N_2$ | $N_3$ | $N_4$ | $N_5$ | r | n | S |
|---|---|---|---|---|---|---|---|---|---|---|---|
| 1 | 1.0 | 7.53326 | 1.8 | 0 | $6.32812 \times 10^{-4}$ | $1.18527 \times 10^{-5}$ | $2.58809 \times 10^{-7}$ | $9.01457 \times 10^{-9}$ | 8.0 | 1.8 | 0.003326 |
| 2 | 1.0 | 6.54254 | 1.7 | 0 | $7.37245 \times 10^{-4}$ | $1.62218 \times 10^{-5}$ | $4.03505 \times 10^{-7}$ | $1.82236 \times 10^{-8}$ | 7.0 | 1.7 | 0.004254 |
| 3 | 1.0 | 5.55661 | 1.6 | 0 | $8.88889 \times 10^{-4}$ | $2.39557 \times 10^{-5}$ | $6.82001 \times 10^{-7}$ | $4.48746 \times 10^{-8}$ | 6.0 | 1.6 | 0.005661 |
| 4 | 0.5 | 6.79093 | 1.7 | 0 | $1.47449 \times 10^{-3}$ | $3.28899 \times 10^{-5}$ | $8.20473 \times 10^{-7}$ | $4.02734 \times 10^{-8}$ | 7.0 | 1.7 | 0.004093 |
| 5 | 1.5 | 6.29487 | 1.7 | 0 | $4.91497 \times 10^{-4}$ | $1.06678 \times 10^{-5}$ | $2.64244 \times 10^{-7}$ | $1.09296 \times 10^{-8}$ | 7.0 | 1.7 | 0.004487 |
| 6 | 1.18301 | 7.5 | 1.8 | 0 | $5.34916 \times 10^{-4}$ | $1.00625 \times 10^{-5}$ | $2.20409 \times 10^{-7}$ | $7.81336 \times 10^{-9}$ | 8.0 | 1.8 | 0.0091505 |
| 7 | 1.0 | 7.5 | 1.8 | 0 | $6.32812 \times 10^{-4}$ | $1.17921 \times 10^{-5}$ | $2.56356 \times 10^{-7}$ | $8.72166 \times 10^{-9}$ | 8.0 | 1.8 | 0 |

I claim:

1. An imaging lens system comprising a distributed index lens which has planar opposite end surfaces and in which the index gradient near the optic axis is substantially zero and the refractive index becomes progressively higher from the optic axis toward the marginal portion, and a plano-convex lens, having a planar surface on the side thereof which is adjacent to said distributed index lens, formed of a homogeneous medium.

2. An imaging lens system according to claim 1, which satisfies the following condition:

$$|(\tfrac{1}{2}d_1 + d_2 - r)/f| < 0.01,$$

where $d_1$ is the lens thickness of said distributed index lens, $d_2$ and 4 are the on-axis thickness and the absolute value of the radius of curvature, respectively, of said plano-convex lens, and f is the focal length of the entire system.

3. An imaging lens system according to claim 1, wherein the planar surface of said distributed index lens and the planar surface of said plano-convex lens are joined together.

4. An imaging lens system according to claim 1, wherein the planar surface of said distibuted index lens and the planar surface of said plano-convex lens are opposed in parallelism to each other with an air space interposed therebetween.

5. A lens system comprising:
a distributed index lens which has planar opposite end surfaces and in which there is an index gradient; and
a plano-convex lens having a planar surface on a side thereof which is adjacent to said distributed index lens;
wherein the following condition is satisfied:

$$|(\tfrac{1}{2}d_1 + d_2 - r)/f| < 0.01,$$

where $d_1$ is the lens thickness of said distributed index lens, $d_2$ and r are the on-axis thickness and the absolute value of the radius of curvature, respectively, of said plano-convex lens, and f is the focal length of the entire system.

6. A lens system according to claim 5, wherein the planar surface of said distributed index lens and the planar surface of said plano-convex lens are joined together.

7. A lens system according to claim 6, wherein the following condition is satisfied:

$$d_1 < d_2.$$

8. A lens system according to claim 6, wherein said index gradient near the optical axis is substantially zero and the refractive index becomes progressively higher from the optical axis toward the marginal portion, in said distributed index lens.

9. A lens system according to claim 8, wherein said plano-convex lens is composed of a homogeneous medium.

10. A lens system comprising:
a distributed index lens which has planar opposite end surfaces and in which there is an index gradient; and
a plano-convex lens having a planar surface on the side thereof which is adjacent to said distributed index lens;
wherein the absolute value of the radius of curvature of said plano-convex lens is substantially equal to $d_1/2 + d_2$, where $d_1$ is the lens thickness of said distributed index lens and $d_2$ is the on-axis thickness of said plano-convex lens.

* * * * *

UNITED STATES PATENT AND TRADEMARK OFFICE
CERTIFICATE OF CORRECTION

PATENT NO. : 4,852,981

DATED : August 1, 1989

INVENTOR(S) : SHIGEYUKI SUDA

It is certified that error appears in the above-identified patent and that said Letters Patent is hereby corrected as shown below:

COLUMN 5

Line 42, "4" should read --r--.

Signed and Sealed this

Tenth Day of April, 1990

*Attest:*

HARRY F. MANBECK, JR.

*Attesting Officer*  Commissioner of Patents and Trademarks